(12) United States Patent
Chung

(10) Patent No.: US 12,350,976 B2
(45) Date of Patent: Jul. 8, 2025

(54) TIRE

(71) Applicant: NEXEN TIRE CORPORATION, Yangsan-si (KR)

(72) Inventor: Kyung Hoon Chung, Seoul (KR)

(73) Assignee: Nexen Tire Corporation, Yangsan-si (KR)

( * ) Notice: Subject to any disclaimer, the term of this patent is extended or adjusted under 35 U.S.C. 154(b) by 0 days.

(21) Appl. No.: 18/052,135

(22) Filed: Nov. 2, 2022

(65) Prior Publication Data

US 2023/0286332 A1    Sep. 14, 2023

(30) Foreign Application Priority Data

Nov. 3, 2021    (KR) .................. 10-2021-0149990

(51) Int. Cl.
  *B60C 19/00*    (2006.01)
  *B60C 23/00*    (2006.01)
  *B60C 23/04*    (2006.01)

(52) U.S. Cl.
  CPC .......... *B60C 19/00* (2013.01); *B60C 23/0433* (2013.01)

(58) Field of Classification Search
  CPC ...... B60C 23/0433; B60C 19/08; B60C 19/00
  See application file for complete search history.

(56) References Cited

U.S. PATENT DOCUMENTS

| 5,019,617 | A | * | 5/1991 | Kaidoo | C08K 3/04 152/565 |
| 2001/0041765 | A1 | * | 11/2001 | Kirino | C08K 3/36 524/492 |
| 2020/0164605 | A1 | * | 5/2020 | Yoshida | H01Q 1/2225 |
| 2020/0207160 | A1 | * | 7/2020 | Suita | B29D 30/0061 |
| 2020/0298632 | A1 | * | 9/2020 | Miura | B60C 13/00 |

FOREIGN PATENT DOCUMENTS

| EP | 1533144 A1 | * | 5/2005 | .......... B60C 11/005 |
| JP | 2001-343839 | | * 12/2001 | |
| JP | 2005-323339 A | | 11/2005 | |
| JP | 2007-230261 A | | 9/2007 | |

(Continued)

OTHER PUBLICATIONS

Machine translation of JP 2001-343839, 2001.*

(Continued)

*Primary Examiner* — Justin R Fischer
(74) *Attorney, Agent, or Firm* — Knobbe, Martens, Olson & Bear, LLP

(57) ABSTRACT

A tire mounted on a transportation means is proposed. The tire may include a tire body including a tread region that faces the surface of the road during at least the driving of the transportation means. The tire may also include an electromagnetic tag module disposed in the tire body and configured to transmit or receive one or more signals. The electromagnetic tag module may include an electromagnetic tag, and a cover layer that is disposed on an inner side surface of the electromagnetic tag and separate from the tire body. The cover layer may include a base rubber, a reinforcing filler, and an insulating filler, has a specific resistance of $10^7$ Ω·m or more, and may improve the durability and radio wave recognition distance of the electromagnetic tag.

16 Claims, 18 Drawing Sheets

(56) References Cited

FOREIGN PATENT DOCUMENTS

| | | |
|---|---|---|
| JP | 2018-502194 A | 1/2018 |
| JP | 2021-084513 A | 6/2021 |
| JP | 2021-129301 A | 9/2021 |
| KR | 10-2019-0115627 A | 10/2019 |

OTHER PUBLICATIONS www.lawinsider.com/dictionary/disposed-on, no date.*
Office Action dated Nov. 16, 2021 in Korean Application No. 10-2021-0149990.
Notice of Allowance dated Feb. 10, 2022 in Korean Application No. 10-2021-0149990.

* cited by examiner

TIRE

CROSS-REFERENCE TO RELATED APPLICATION

This application is based on and claims priority under 35 USC § 119 to Korean Patent Application No. 10-2021-0149990, filed on Nov. 3, 2021, in the Korean Intellectual Property Office, the disclosure of which is incorporated by reference herein in its entirety.

BACKGROUND

Technical Field

The present disclosure relates to a tire.

Description of Related Technology

Transportation means operated by users, for example, vehicles are composed of many components. Among these, tires may be one of the key components for securing the safety of the user, as well as substantially and significantly affecting the driving of the transportation means. Such tires may be used in various transportation means, for example, aircrafts or various other transportation means, in addition to the vehicles.

SUMMARY

Embodiments of the present disclosure provide a tire having excellent durability and radio wave recognition properties.

Additional aspects will be set forth in part in the description which follows and, in part, will be apparent from the description, or may be learned by practice of the presented embodiments of the disclosure.

According to an aspect of the present disclosure, there is provided a tire that is mounted on a transportation means, and includes a tire body including a tread region that faces the surface of the road during at least the driving of the transportation means, and an electromagnetic tag module disposed in the tire body and configured to transmit or receive one or more signals, wherein, the electromagnetic tag module includes an electromagnetic tag, and a cover layer that is disposed on an inner side surface of the electromagnetic tag and separate from the tire body, wherein the cover layer includes a base rubber, a reinforcing filler, and an insulating filler, and has a specific resistance of $10^7$ Ω·m or more.

In some embodiments, the electromagnetic tag module may be disposed in a region adjacent to a tread portion of the tire body, a region adjacent to a sidewall, a region adjacent to a connection portion of the tread portion and the sidewall, or an inside of the bead part.

In some embodiments, the reinforcing filler may include carbon black or boron nitride.

In some embodiments, the insulating filler may include at least one selected from silica, titanium dioxide, talc, and calcium carbonate.

In some embodiments, the cover layer may include at least 10 parts by weight of the insulating filler based on 100 parts by weight of the base rubber.

In some embodiments, in the cover layer, a total amount of the reinforcing filler and the insulating filler may be 40 parts by weight or more based on 100 parts by weight of the base rubber.

In some embodiments, the cover layer may be formed of a rubber composition including a base rubber, a reinforcing filler, an insulating filler, and a reinforcing resin component.

In some embodiments, the cover layer may have a modulus of 50 kgf/cm² or more.

In some embodiments, the cover layer may have a Shore A hardness of 50 HS or more.

In some embodiments, the cover layer may have a tensile strength of 150 kgf/cm².

In some embodiments, the cover layer may be disposed on one surface of the electromagnetic tag, and a radio wave guide layer may be disposed on a surface opposite to the one surface.

Other aspects, features, and advantages other than the above-described features will be apparent from the following drawings, claims, and detailed descriptions of the disclosure.

BRIEF DESCRIPTION OF THE DRAWINGS

The above and other aspects, features, and advantages of certain embodiments of the disclosure will be more apparent from the following description taken in conjunction with the accompanying drawings.

DETAILED DESCRIPTION

Figure 1:
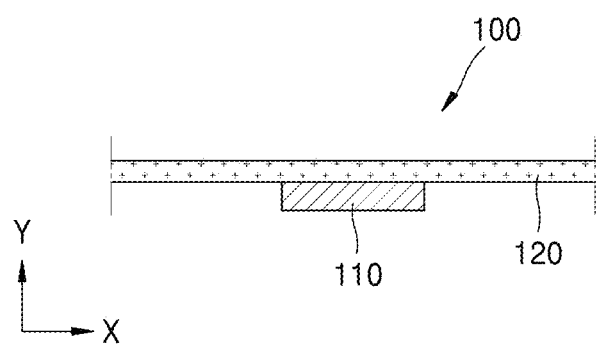
FIG. 1 is a schematic cross-sectional view of an electromagnetic tag module according to some embodiments.

Radio-frequency identification (RFID) is a technology for recognizing information at a distant place by using radio waves through a system that identifies IDs using frequencies and widely used not only to measure product records and track product production history, but also to record and recognize personal information, and the RFID has the advantage of being able to record more various pieces of information than a barcode system and assigning a serial number to each product.

Due to these characteristics, recently, in a tire industry, there is a demand of applying an RFID tag in a tire so that the logistics and history of the tire may be managed in a process in which vehicles are manufactured and transported. In addition, when the RFID tag is applied in the tire, a recognition rate is close to 100%, and the longer the recognition distance, the more advantageous in tire logistics and history management, and thus, research is being actively conducted to increase the recognition rate and recognition distance of the RFID tag.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. The embodiments are merely described below, by referring to the figures, to explain aspects. As used herein, the term "and/or"; includes any and all combinations of one or more of the associated listed items. Expressions such as "at least one of," when preceding a list of elements, modify the entire list of elements and do not modify the individual elements of the list.

The present disclosure may include various embodiments and modifications, and embodiments thereof will be illustrated in the drawings and will be described herein in detail. The effects and features of the present disclosure and the accompanying methods thereof will become apparent from the following description of the embodiments, taken in conjunction with the accompanying drawings. However, the present disclosure is not limited to the embodiments described below, and may be embodied in various modes.

The present disclosure provides a tire that is mounted on a transportation means, includes a tire body including a tread region that faces the surface of the road during at least the driving of the transportation means and an electromagnetic tag module disposed in the tire body and configured to transmit or receive one or more signals, wherein, the electromagnetic tag module includes an electromagnetic tag, and a cover layer that is disposed on an inner side surface of the electromagnetic tag and separate from the tire body, wherein the cover layer includes a base rubber, a reinforcing filler, and an insulating filler, has a specific resistance of $10^7$ Ω·m or more, and allows the electromagnetic tag to be effectively fixed and protected and to increase the radio wave recognition distance of the electromagnetic tag.

Hereinafter, the embodiments of the present disclosure will be described below in detail with reference to the accompanying drawings, and when the embodiments of the present disclosure are described with reference to the drawings, the same or corresponding components are given the same reference numerals, and repetitive descriptions thereof will be omitted.

In the following embodiments, the terms "first," "second," and the like have been used to distinguish one component from another, rather than limitative in all aspects.

In the following embodiments, singular forms are intended to include plural forms as well, unless the context clearly indicates otherwise.

In the following embodiments, the terms such as "including," "having," and "comprising" are intended to indicate the existence of features or components disclosed in the specification, and are not intended to preclude the possibility that one or more other features or components may be added.

For convenience of description, sizes of components shown in the drawings may be exaggerated or reduced. For example, since the size and thickness of each component illustrated in the drawing are arbitrarily shown for convenience of description, the present disclosure is not necessarily limited to those illustrated in the drawing.

In the following embodiments, an x-axis, a y-axis, and a z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

When a certain embodiment may be implemented differently, a specific process sequence may be performed differently from the described order. For example, two consecutively described processes may be performed substantially at the same time or performed in an order opposite to the described order.

A tire according to embodiments includes a tire body including a tread region that faces the surface of the road during at least the driving of the transportation means, and an electromagnetic tag module disposed in the tire body and configured to transmit or receive one or more signals, wherein, the electromagnetic tag module includes an electromagnetic tag, and a cover layer that is disposed on an inner side surface of the electromagnetic tag and separate from the tire body.

Figure 3:
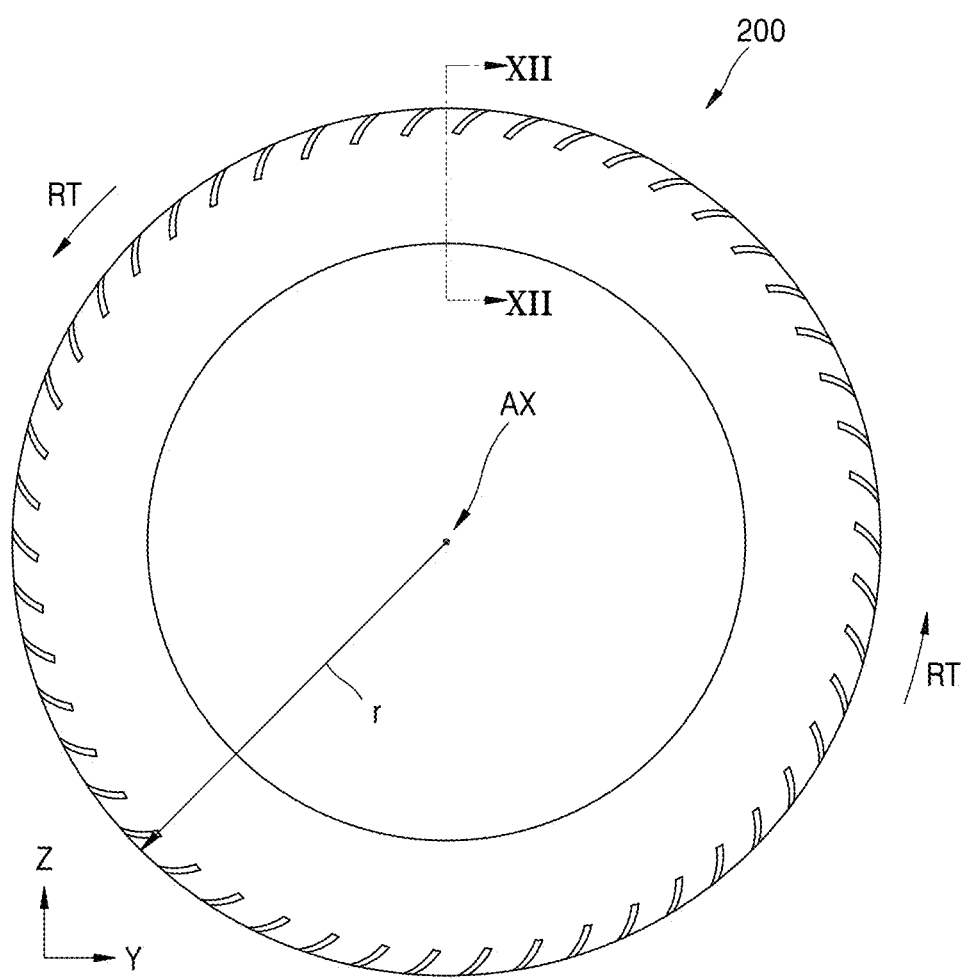
FIG. 3 is a schematic front view of a tire according to some embodiments.
Figure 4:
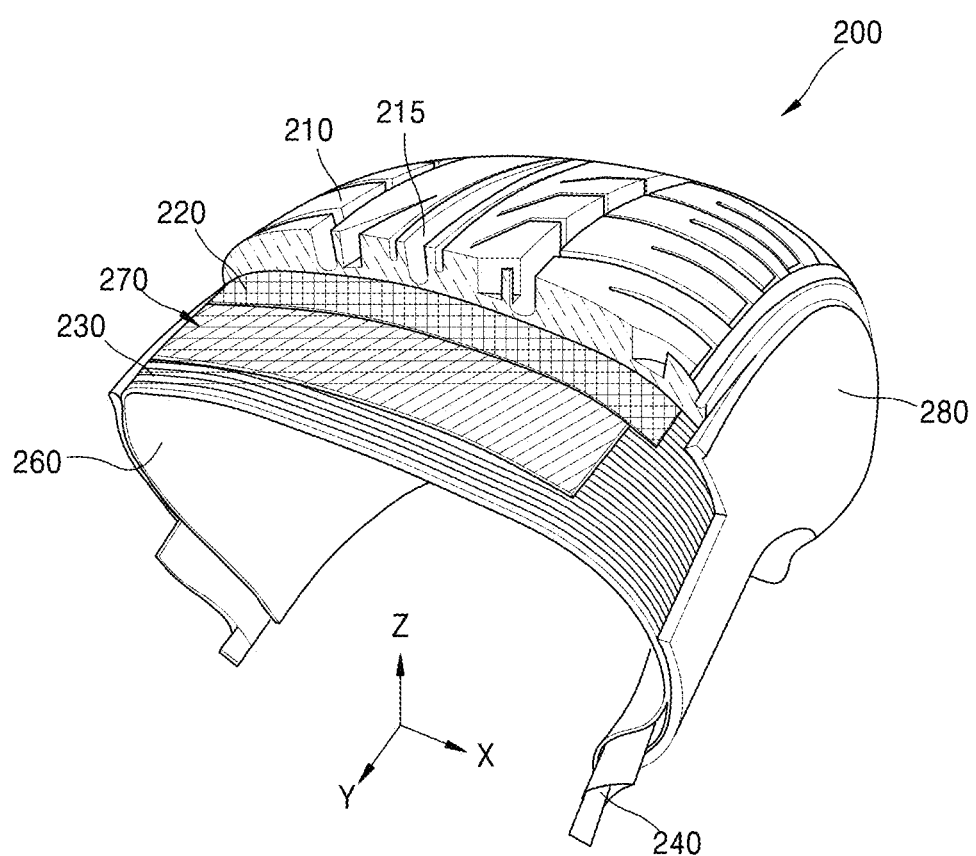
FIG. 4 is a schematic perspective cross-sectional view of the tire according to some embodiments.
Figure 5:
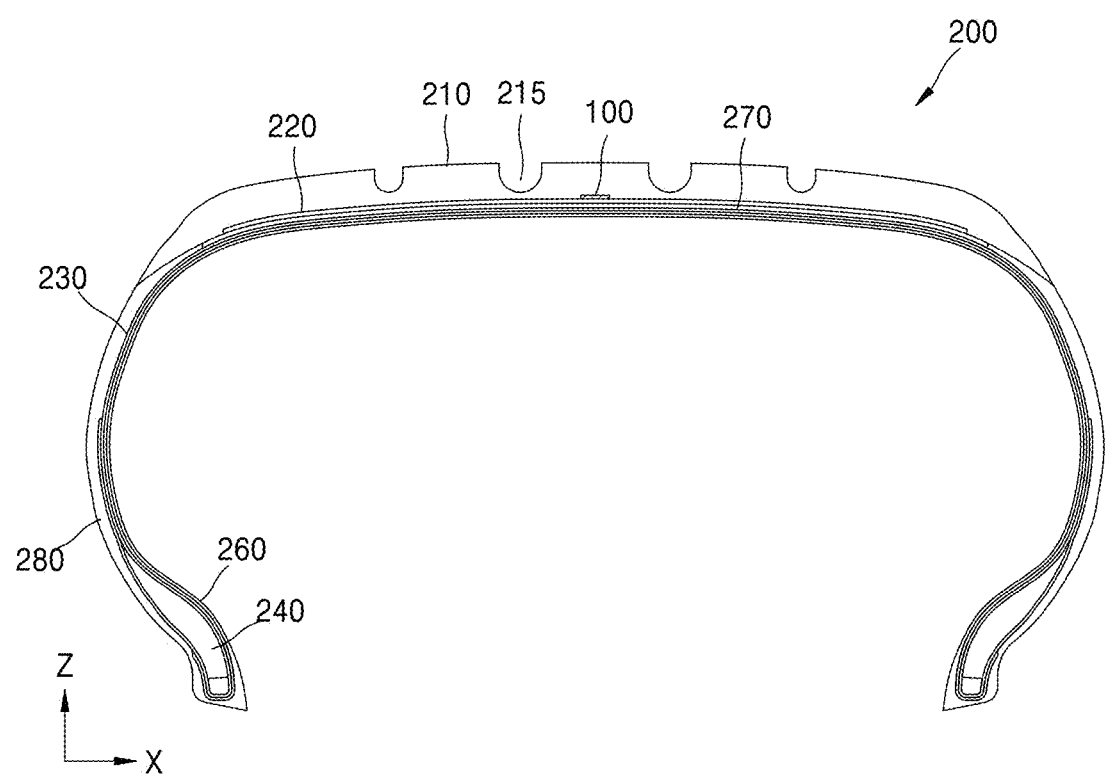
FIG. 5 is a schematic cross-sectional view in a thickness direction of the tire according to some embodiments.

FIG. 3 is a schematic front view of a tire according to some embodiments. FIG. 4 is a schematic perspective cross-sectional view of the tire according to some embodiments. FIG. 5 is a schematic cross-sectional view in a thickness direction of the tire according to some embodiments.

Referring to FIGS. 3 to 5, a tire 200 may include a tire body and an electromagnetic tag module 100.

The electromagnetic tag module 100 may be disposed in the tire body.

One or more signals may be transmitted or received through the electromagnetic tag module 100 disposed in the tire 200, and various pieces of information may be secured and used by using the electromagnetic tag module 100 in the form of, for example, a radio-frequency identification (RFID) tag. In an embodiment, information related to the use of the tire 200 or driving-related information after the tire 200 is mounted on a vehicle may be easily secured.

Further, various pieces of information for each tire may be easily managed, so that the various pieces of information may be easily and precisely managed in tire manufacturing, sales, and post-management.

The tire body may be formed to include at least a tread region. For example, the tread region of the tire body may include a region brought into contact with the surface of the road during driving of a transportation means. The tread region may have one or more patterns, and a plurality of grooves may be formed to be adjacent to these patterns. As an optional embodiment, the tire body may include a sidewall 280 connected to the tread region, for example, the sidewall 280 may be formed in a region facing the outside and inside after the tire is mounted on a vehicle.

The transportation means may be of a variety of types and may be, for example, vehicles, aircraft, and other various means to which tires may be applied.

The electromagnetic tag module 100 may be disposed in one region of the tire body, and specifically, may be disposed in an inner region of the tire body.

The tire of the present embodiment is allowed to transmit or receive one or more signals by disposing the electromagnetic tag module in one region thereof, and to secure and use various pieces of information by using the electromagnetic tag module in the form of, for example, an RFID tag.

Further, various pieces of information for each tire may be easily managed, so that the various pieces of information may be easily and precisely managed in tire manufacturing, sales, and post-management.

The electromagnetic tag module includes an electromagnetic tag and a cover layer disposed on at least one surface of the electromagnetic tag. The cover layer includes a base rubber, a reinforcing filler, and an insulating filler and has a specific resistance of $10^7$ Ω·m or more.

FIG. 1 is a schematic cross-sectional view of the electromagnetic tag module according to some embodiments.

Referring to FIG. 1, the electromagnetic tag module 100 according to embodiments includes an electromagnetic tag 110 and a cover layer 120.

The electromagnetic tag module 100 may be formed to transmit or receive one or more signals. For example, the electromagnetic tag module 100 may include one or more electrical elements.

In an embodiment, the electromagnetic tag module 100 may include a sensor element capable of identifying one or more pieces of information.

In an embodiment, the electromagnetic tag module 100 may include an electromagnetic tag, and such a chip may be formed to perform one or more processing operations and may include other memory circuitry.

As an optional embodiment, the electromagnetic tag module 100 may include one or more antenna portions, and such antenna portions may be connected to the electromagnetic tag.

The electromagnetic tag 110 may transmit and receive wireless signals through electromagnetic waves. In some embodiments, the electromagnetic tag 110 may include an RFID tag that uses a radio frequency region.

The electromagnetic tag 110 may be formed to process one or more signals and may include other memory circuitry.

The cover layer 120 may be disposed on at least one surface of the electromagnetic tag 110. For example, the cover layer 120 may be disposed adjacent to the electromagnetic tag 110. The cover layer 120 may fix the position of the electromagnetic tag 110 and protect the electromagnetic tag 110. In addition, by having a high resistance, the cover layer 120 may suppress the loss of an electromagnetic signal transmitted and received by the electromagnetic tag 110 to improve signal transmission and recognition efficiency.

The cover layer may cover the electromagnetic tag to protect the electromagnetic tag from physical and mechanical impacts. In addition, the cover layer may have excellent coupling force and bonding force with a rubber component of the tire body to effectively fix the electromagnetic tag mounted on the tire The cover layer 120 may be formed of a rubber composition including a base rubber, a reinforcing filler, and an insulating filler. In some embodiments, the cover layer 120 may be formed of a rubber composition further including a reinforcing resin component.

The cover layer 120 may have a high electrical resistance and may be disposed adjacent to the electromagnetic tag 110 to improve the efficiency of the electrical signal transmitted through the electromagnetic tag module 100. For example, a signal recognition distance at which the signal of the electromagnetic tag module 100 is recognized may be increased.

Meanwhile, the cover layer 120 may be disposed between the electromagnetic tag 110 and one region of the tire body. As an optional embodiment, due to the cover layer, the electromagnetic tag 110 may be disposed not in direct contact with the tire body through 120.

In the present embodiment, the electromagnetic tag module 100 may have various other types of structures, and the type of the RFID tag may be determined in various ways. For example, the electromagnetic tag module 100 may have a structure in which a battery for operating the RFID is built-in, or may be a passive device type without a battery. In addition, when a memory is included in the electromagnetic tag provided in the RFID, various types of functions such as reading and writing the memory may be enabled.

In some embodiments, the cover layer may have a modulus of 50 kgf/cm$^2$ or more. Preferably, the modulus of the cover layer may be greater than or equal to 60 kgf/cm$^2$.

In some embodiments, the cover layer may have a Shore A hardness of 50 HS or more. Preferably, the Shore A hardness of the cover layer may be greater than or equal to 60 HS.

In some embodiments, the cover layer may have a tensile strength of 150 kgf/cm$^2$. Preferably, the tensile strength of the cover layer may be greater than or equal to 160 kgf/cm$^2$.

In some embodiments, the cover layer may be disposed on one surface of the electromagnetic tag, and a radio wave guide layer may be disposed on a surface opposite to the one surface.

Figure 2:
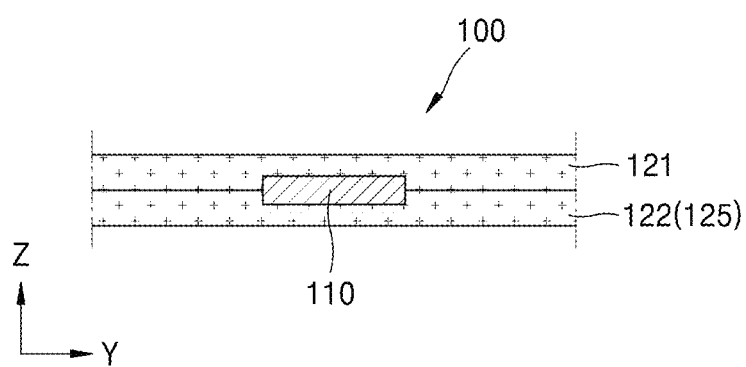
FIG. 2 is a schematic cross-sectional view of an electromagnetic tag module according to some embodiments.

FIG. 2 is a schematic cross-sectional view of an electromagnetic tag module according to some embodiments.

Referring to FIG. 2, an electromagnetic tag module 100 may include an electromagnetic tag 110, an upper cover layer 121 disposed on one surface (upper surface) of the electromagnetic tag 110, and a lower cover layer 122 disposed on an opposite surface (lower surface) of the electromagnetic tag 110.

For example, the electromagnetic tag 110 may be disposed between the upper cover layer 121 and the lower cover layer 122.

As an optional embodiment, the electromagnetic tag 110 may be disposed between the upper cover layer 121 and the lower cover layer 122 to be in close contact with the upper cover layer 121 and the lower cover layer 122. As an optional embodiment, the electromagnetic tag 110 may be disposed to be sealed with the upper cover layer 121 and the lower cover layer 122.

For example, the upper cover layer 121 and the lower cover layer 122 may be disposed to be connected to each other, for example, may be disposed to be in contact with each other in a region in which the electromagnetic tag 110 is not disposed. Accordingly, the electromagnetic tag 110 may have a shape that is sealed between the upper cover layer 121 and the lower cover layer 122.

In some embodiments, the lower cover layer 122 may include a radio wave guide layer 125. For example, the radio wave guide layer 125 may be provided as the lower cover layer 122.

The radio wave guide layer 125 may have a relatively low resistance as compared to the upper cover layer 121, and thus may guide a direction and path, in which the signal of the electromagnetic tag 110 is transmitted, to a direction, in which the radio wave guide layer 125 is formed, from the electromagnetic tag 110. Thus, a direction in which a signal of the electromagnetic tag 110 is radiated and received may be concentrated in one direction, thereby improving radio wave recognition efficiency in the corresponding direction. For example, when the radio wave guide layer 125 is disposed to face the outside of the tire, wireless communication efficiency and reliability between the radio wave guide layer 125 and the electromagnetic tag 110 may be improved even at a distant place outside the tire.

In some embodiments, the radio wave guide layer 125 may have a specific resistance less than $10^7$ Ω·m. Preferably, the specific resistance of the radio wave guide layer 125 may be less than $10^5$ Ω·m or less than $10^4$ Ω·m. In this case, a direction in which the radio wave of the electromagnetic tag module 100 is transmitted and received is concentrated in the direction in which the radio wave guide layer 125 is formed so that the radio wave recognition distance and efficiency in the corresponding direction may be improved.

In some embodiments, the radio wave guide layer 125 may have a Shore A hardness of 60 HS or more, a modulus of 70 kgf/cm$^2$ or more, and an elongation at break of 500% or more. In this case, the mechanical properties and durability of the electromagnetic tag module 100 may be improved, and the coupling and position fixing properties of the electromagnetic tag module 100 for the tire may be improved.

The upper cover layer 121 and the lower cover layer 122 may each be formed to have a length greater than a width. For example, each the upper cover layer 121 and the lower cover layer 122 may have a width in a range of 0.5 to 2 centimeters, and may have a length in a range of 4 to 6 centimeters. In addition, as needed, the width and length of each of the upper cover layer 121 and the lower cover layer 122 may be variously determined according to the size and use of the tire to be applied.

In some embodiments, the radio wave guide layer 125 may include a second base rubber and a second reinforcing filler, and may include 40 parts by weight or more of the second reinforcing filler based on 100 parts by weight of the second base rubber. The second base rubber may include the base rubber described above. The second reinforcing filler may include carbon black or acetylene black. In some embodiments, the second reinforcing filler may include 40 parts by weight or more of carbon black based on 100 parts by weight of the second base rubber. In some embodiments, the second reinforcing filler may further include 20 parts by weight or more of acetylene black based on 100 parts by weight of the second base rubber.

The cover layer 120 may have a specific resistance of $10^7$ Ω·m or more, thereby limiting a region, in which the electrical signal and the radio wave are generated and applied, to a region inside the electromagnetic tag. Accordingly, the radio wave radiation and/or recognition efficiency of the electromagnetic tag may be increased.

For example, in a case in which a signal is transmitted through the electromagnetic tag 110 of the electromagnetic tag module 100, when a resistance of each of the composition for the electromagnetic tag cover and the cover layer 120 is low, a case in which an electrical signal is converted into electrical energy or an electrical interference is generated in the cover layer 120 is reduced so that signal transmission efficiency may be improved, and as a result, a signal recognition distance may be increased. In an embodiment, when the electromagnetic tag module 100 is in the form of an RFID tag, the signal recognition efficiency of a RFID reader may be improved.

In some embodiments, a specific resistance of each of a rubber composition for the electromagnetic tag cover and the cover layer 120 formed from the rubber composition may be $3\times10^7$ Ω·m or more, $5\times10^7$ Ω·m or more, $10^{10}$ Ω·m or more, or $3*10^{10}$ Ω·m or more.

The base rubber may include, but is not limited to, a rubber material that may protect and fix the electromagnetic tag by being effectively coupled to the electromagnetic tag and the tire and having impact resistance. For example, the base rubber may include rubber materials such as natural rubber (NR), polyisoprene rubber (IR), various types of butadiene rubber (BR), various types of styrene-butadiene copolymer rubber (SBR), acrylonitrile-butadiene copolymer rubber (NBR), chloroprene rubber (CR), ethylene-propylene diene copolymer rubber (EPDM), styrene-isoprene copolymer rubber, styrene-isoprene-butadiene copolymer rubber, isoprene-butadiene copolymer rubber, and the like.

In some embodiments, the base rubber may include the same rubber material as the base rubber material constituting the tire body. In this case, a coupling force between the rubber composition and the tire body may be improved, and the rubber composition may effectively couple and fix the electromagnetic tag to the inside of the tire.

The reinforcing filler may include, but is not limited to, materials that enhance the mechanical properties (e.g., strength and durability) of the rubber composition, and may include, for example, carbon black, acetylene black, boron nitride, and the like.

In some embodiments, the reinforcing filler may include carbon black or boron nitride. Preferably, the reinforcing filler may include carbon black, and in this case, the mechanical properties and the resistance of the rubber composition may be effectively controlled.

The insulating filler may include, but is not limited to, fillers that may reduce the conductivity of the entire rubber composition and increase the resistance by having electrical insulation properties. For example, the insulating filler may include an oxide or a carbonate of metal and metalloid as an inorganic filler having a specific resistance of a predetermined value or more.

In some embodiments, the insulating filler may include at least one selected from silica ($SiO_2$), titanium dioxide ($TiO_2$), talc, and calcium carbonate ($CaCO_3$). Preferably, the insulating filler may include silica, and in this case, excellent mechanical properties may be secured while effectively increasing a resistance of the rubber composition to $10^7$ Ω·m or more.

In some embodiments, the insulating filler may be included in an amount of 10 parts by weight or more based on 100 parts by weight of the base rubber. In this case, the resistance of the rubber composition may be effectively adjusted to $10^7$ Ω·m or more, and the mechanical properties are also improved to an excellent level so that the electromagnetic tag may be effectively protected for a long period of time even during the movement of the tire. In one embodiment, the insulating filler may be included in an amount of 30 parts by weight or more based on 100 parts by weight of the base rubber.

In some embodiments, a total amount of the reinforcing filler and the insulating filler may be 40 parts by weight or more based on 100 parts by weight of the base rubber. In this case, both the resistance and the mechanical properties of the rubber composition may be improved. In one embodiment, a total amount of the reinforcing filler and the insulating filler may be 50 parts by weight or more based on 100 parts by weight of the base rubber.

In some embodiments, a reinforcing resin component may be further included. For example, the reinforcing resin component may include, but is not limited to, resin components, which are coupled to each other due to heat or the passage of time and coupled to the cover layer 120 or other component included in the tire, to improve the mechanical properties of the rubber composition or improve the coupling force with the tire.

In some embodiments, the reinforcing resin component may include a phenol-based resin. In an embodiment, the reinforcing resin component may include an alkyl phenol-based resin, and may include an alkyl phenol-formaldehyde resin, a resorcinol-formaldehyde resin, and the like.

For example, the reinforcing resin component may include a phenol-based resin such as an alkyl phenol-formaldehyde resin to improve a coupling force between a hydroxyl group and a rubber-based base material, and improve the tensile strength of the cover layer 120 and the durability of the cover layer 120.

In embodiments, when the rubber composition for the electromagnetic tag cover includes the reinforcing resin component, tensile strength may be secured, and when an insulating filler such as silica for high resistance control is used, the weakening of the coupling force between the insulating filler and the rubber-based base material may be reduced.

In some embodiments, the reinforcing resin component may be included in an amount of 0.5 parts by weight to 5 parts by weight based on 100 parts by weight of the base rubber. In this case, the coupling force with the rubber-based base material is improved, and miscibility and compatibility with the insulating filler may be improved. Preferably, the reinforcing resin component may be included in an amount of 1 part by weight to 3 parts by weight based on 100 parts by weight of the base rubber.

In some embodiments, the reinforcing resin component may include a petroleum resin-based material, a coumarone indene-based resin, a cresol-formaldehyde resin, and the like.

Referring to FIGS. 3 to 5, the tire 200 of the present embodiment may include a tread portion 210, the sidewall 280, and the electromagnetic tag module 100.

Referring to FIG. 3, the tire 200 may have a shape extending in a circumferential direction RT about a central axis AX. In addition, a wheel (not shown) may be coupled to an inner side of the tire 200 with respect to a radial direction r from the central axis AX.

The tread portion 210 may include a region that faces the surface of the road when the tire 200 is mounted on a vehicle and then driven. For example, the tread portion 210 may include the region in contact with the road surface when the vehicle is driven.

The tread portion 210 may be formed of various materials. For example, the tread portion 210 may be manufactured by adding various additives to the rubber-based base material.

The tread portion 210 may have one or more patterns, and a plurality of grooves 215 may be formed to be adjacent to these patterns. The groove 215 may have a shape elongated in at least a first direction. In addition, the groove 215 may also include a region having a shape elongated in a direction crossing the first direction.

The number and shape of the grooves 215 may be variously determined depending on the driving characteristics and use of the tire 200.

The sidewall 280 is connected to the tread portion 210. As an optional embodiment, in order to be effectively mounted to the wheel (not shown), the tire 200 may include a bead part 240, and the sidewall 280 may be disposed between the tread portion 210 and the bead part 240.

The sidewall 280 may include a region to be spaced apart from the road surface when the tire 200 is mounted on the vehicle and then driven. Through the sidewall 280, the tire 200 may perform a bending and stretching motion.

The sidewall 280 is formed on both sides with respect to the tread portion 210 of the tire 200, and the material of the sidewall 280 on one side and the material of the sidewall 280 on the other side may be the same.

As an optional embodiment, the material of the sidewall 280 on one side and the material of the sidewall 280 on the other side may be different.

As another optional embodiment, the sidewall 280 on one side and the sidewall 280 on the other side may have different compositions, so that moduli thereof may be different.

As an optional embodiment, the bead part 240 may be formed in a region of the sidewall 280 in a direction opposite to the region of the sidewall 280, which is connected to the tread portion 210.

The bead part 240 may have various shapes and may be formed to include, for example, a core region and a buffer region.

The core region of the bead part 240 may have a region in the form of a wire bundle, which has a square or hexagonal shape, in which a wire, for example, a steel wire is coated with rubber.

The buffer region of the bead part 240 may be formed to surround the core region, and may distribute a load on the core region and mitigate an external impact.

Further, the tire 200 may also include a body ply 230 in a region overlapping at least the tread portion 210.

The body ply 230 forms a main frame of the tire 200, and may support a load received by the tire 200 and absorb an impact of the road surface. As an optional embodiment, the body ply 230 may be in the form of a cord.

As an optional embodiment, a cap ply 220 may be disposed between the body ply 230 and the tread portion 210. The cap ply 220 may be formed of various materials and may be in the form of a plurality of cords.

As an optional embodiment, a belt layer 270 may be further disposed between the cap ply 220 and the body ply 230. The belt layer 270 may mitigate an impact applied to the tire 200 from the road surface when the vehicle equipped with the tire 200 is driven, and may extend a tread surface of the tread portion 210 to improve tread characteristics and driving stability.

The belt layer 270 may be formed in various forms, for example, may be formed of a plurality of layers.

As an optional embodiment, an inner liner 260 may be disposed on an inner side of the body ply 230. The inner liner 260 may be disposed on the innermost side of the tire 200 so that air leakage may be reduced or prevented.

The inner liner 260 may be formed of various materials, for example, may include rubber-based materials to be attached to adjacent layers. In addition, as an optional embodiment, an organic or inorganic material may be included.

The electromagnetic tag module 100 may be disposed in one region of the tire 200, for example, may be disposed in the tread portion 210.

The electromagnetic tag module 100 may be formed to transmit or receive one or more signals and may be one of the electromagnetic tag modules 100 described in the embodiments described above.

As an example, the electromagnetic tag module 100 may be a sensor element capable of checking one or more pieces of information, and as another example, the electromagnetic tag module 100 may include a tag, which is used for RFID, as an electrical element that uses a radio frequency. In an embodiment, the electromagnetic tag module 100 may include the electromagnetic tag 110 and one or more antenna portions. The electromagnetic tag 110 may be formed to process one or more signals and may include other memory circuitry.

In the present embodiment, the electromagnetic tag module 100 may have various other types of structures, and the type of the RFID tag may be determined in various ways. For example, depending on the application, unlike the above, the electromagnetic tag module 100 may be in the form of a tag without having the electromagnetic tag. Further, the electromagnetic tag module 100 may have a structure in which a battery for operating the RFID is built-in, or may be a passive device type without a battery. In addition, when a memory is included in the electromagnetic tag 110 provided in the RFID, various types of functions such as reading and writing the memory may be enabled.

The electromagnetic tag module 100 may be disposed in various ways, and as an example, the electromagnetic tag module 100 may be disposed in the form of being inserted into the tread portion 210. For example, the electromagnetic tag module 100 may be disposed in advance during the manufacturing process of the tire 200 including the tread portion 210 and may be integrally formed with the tire 200 during a forming process. In addition, as another example, the forming process of the tire 200 including the tread portion 210 may be performed, and thereafter, the electromagnetic tag module 100 may be inserted and disposed.

Meanwhile, the electromagnetic tag module 100 may transmit or receive various signals, and during this process, an electrical circuit may operate, and at this point, the electromagnetic tag module 100 may be inserted into the tread portion 210 to have a structure in contact with, In an embodiment, in close contact with the tread portion 210, and accordingly, stable driving may be easily secured.

Figure 6:
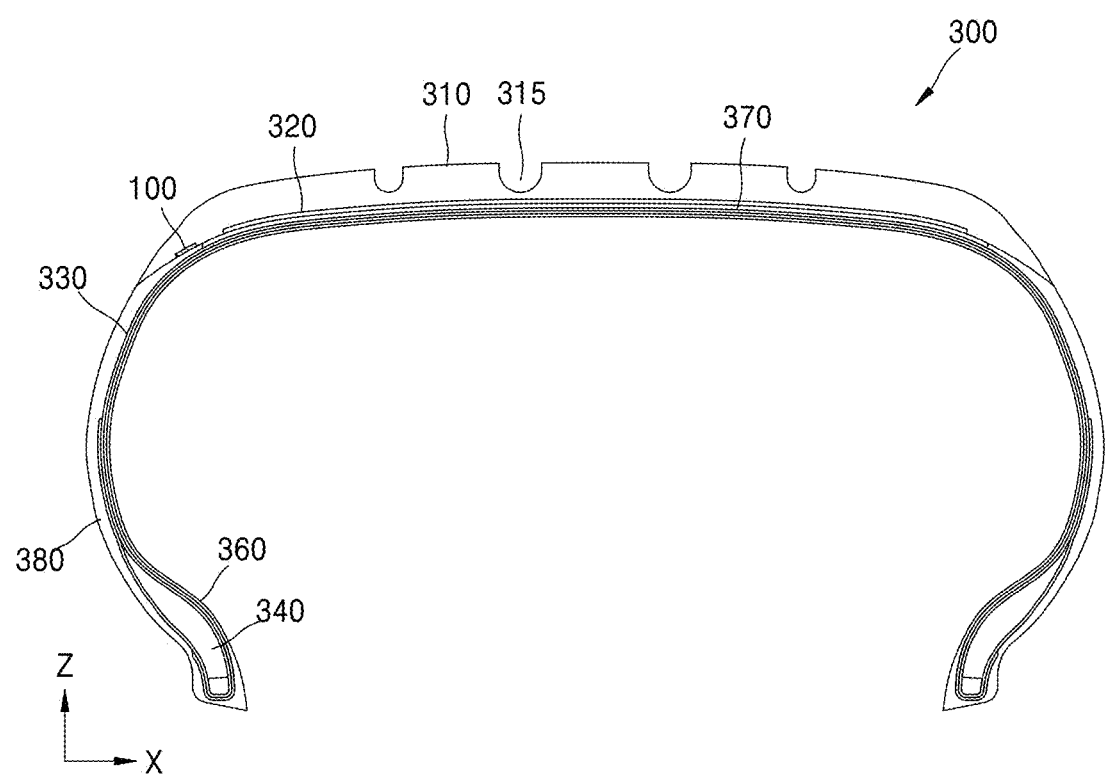
FIG. 6 is a schematic cross-sectional view in a thickness direction of a tire according to some embodiments.

FIG. 6 is a schematic cross-sectional view in a thickness direction of a tire according to some embodiments.

Referring to FIG. 6, a tire 300 according to some embodiments may include a tread portion 310, a sidewall 380, and the electromagnetic tag module 100.

For the convenience of description, descriptions will be provided based on differences from the above-described embodiment.

The tread portion 310, grooves 315, the sidewall 380, a bead part 340, a body ply 330, a cap ply 320, a belt layer 370, and an inner liner 360 illustrated in FIG. 6 are the same as those described in the foregoing embodiment, or some design changes may be made within a similar range, and thus a detailed description thereof will be omitted.

The electromagnetic tag module 100 may be formed in a region far from a center of the tread portion 310 of the tire 300, or may be formed in a region adjacent to a connection portion of the tread portion 310 and the sidewall 380. In addition, as another example, the electromagnetic tag module 100 may be formed further outward than the outermost groove 315 in a region of the tread portion 310.

As an optional embodiment, the electromagnetic tag module 100 may be disposed in a shoulder portion, and a thick thickness of the shoulder portion may facilitate the stable arrangement of the electromagnetic tag module 100.

Figure 7:
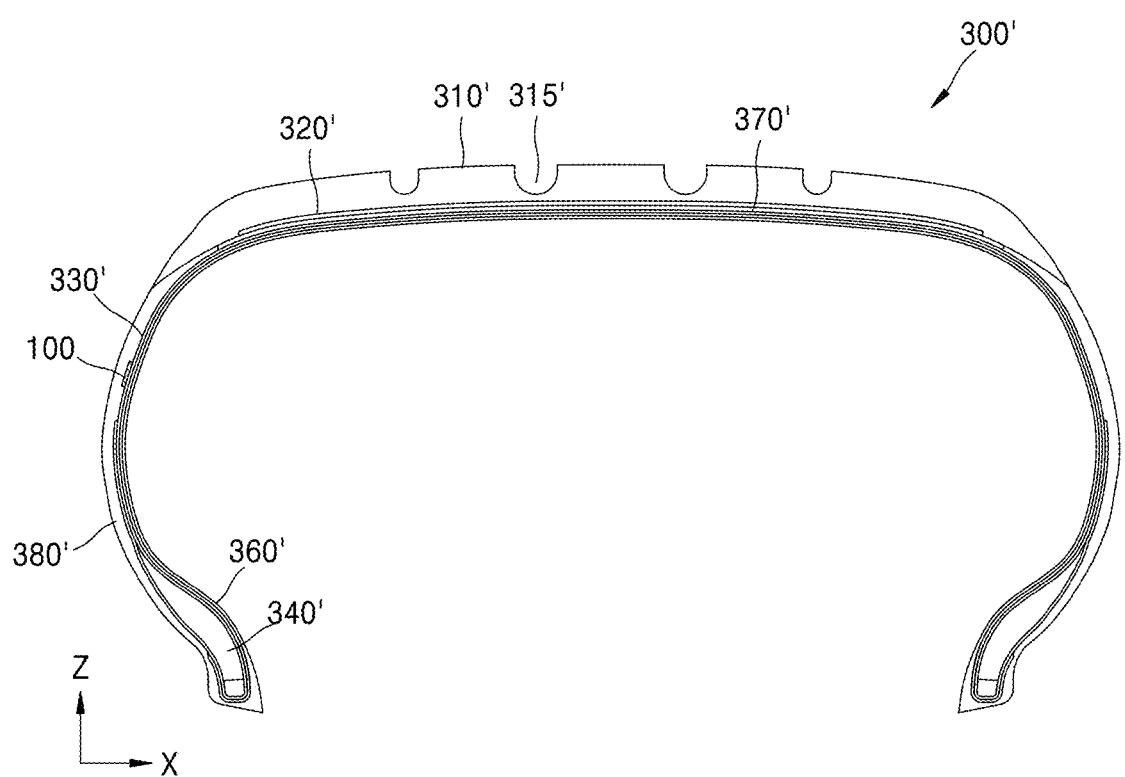
FIG. 7 is a schematic cross-sectional view in a thickness direction of a tire according to some embodiments.

FIG. 7 is a schematic cross-sectional view in a thickness direction of a tire according to some embodiments.

Referring to FIG. 7, a tire 300' of the present embodiment may include a tread portion 310', a sidewall 380', and the electromagnetic tag module 100.

For the convenience of description, descriptions will be provided based on differences from the above-described embodiment.

The tread portion 310', grooves 315', the sidewall 380', a bead part 340', a body ply 330', a cap ply 320', a belt layer 370', and an inner liner 360' illustrated in FIG. 7 are the same as those described in the foregoing embodiments, or some design changes may be made within a similar range, and thus a detailed description thereof will be omitted.

The electromagnetic tag module 100 may be disposed in one region of the sidewall 380' of the tire 300', for example, may be disposed on one inner surface or an inside of the sidewall 380'. Accordingly, the easy of signal recognition in the electromagnetic tag module 100 may be improved even outside the tire 300'.

Figure 8:
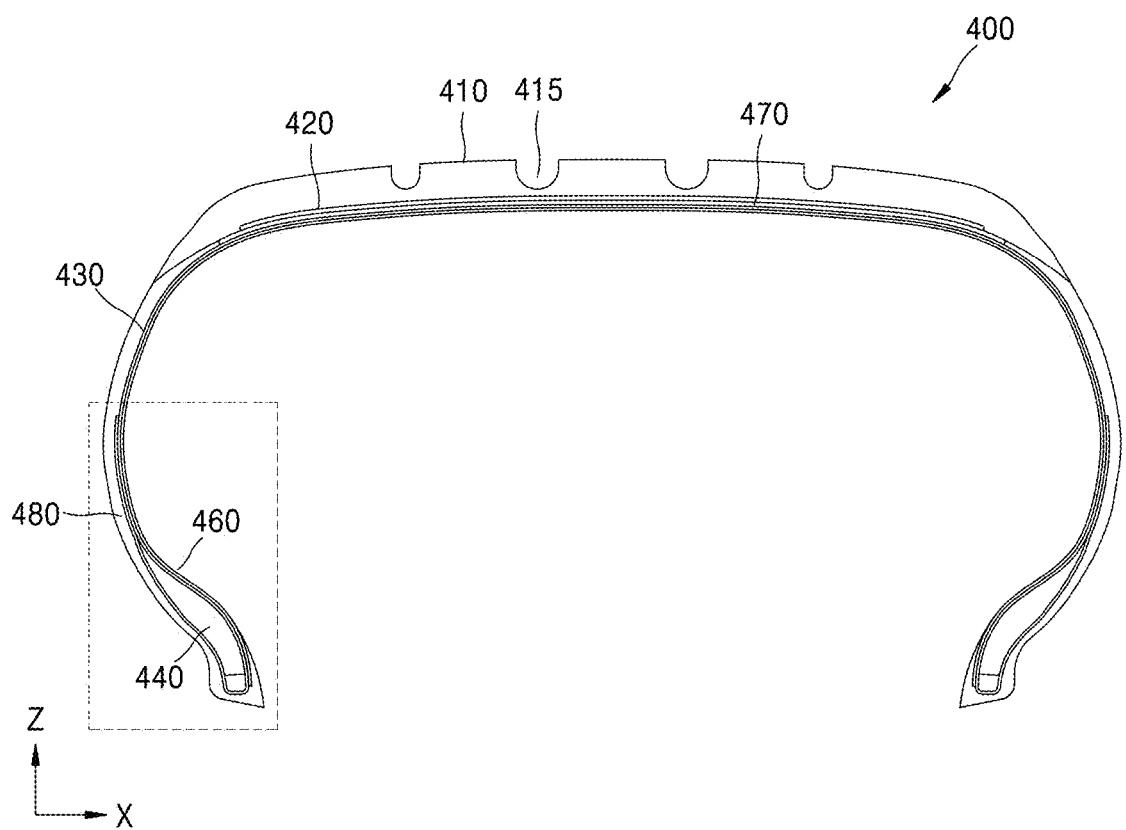
FIG. 8 is a schematic cross-sectional view in a thickness direction of a tire according to some embodiments.
Figure 9:
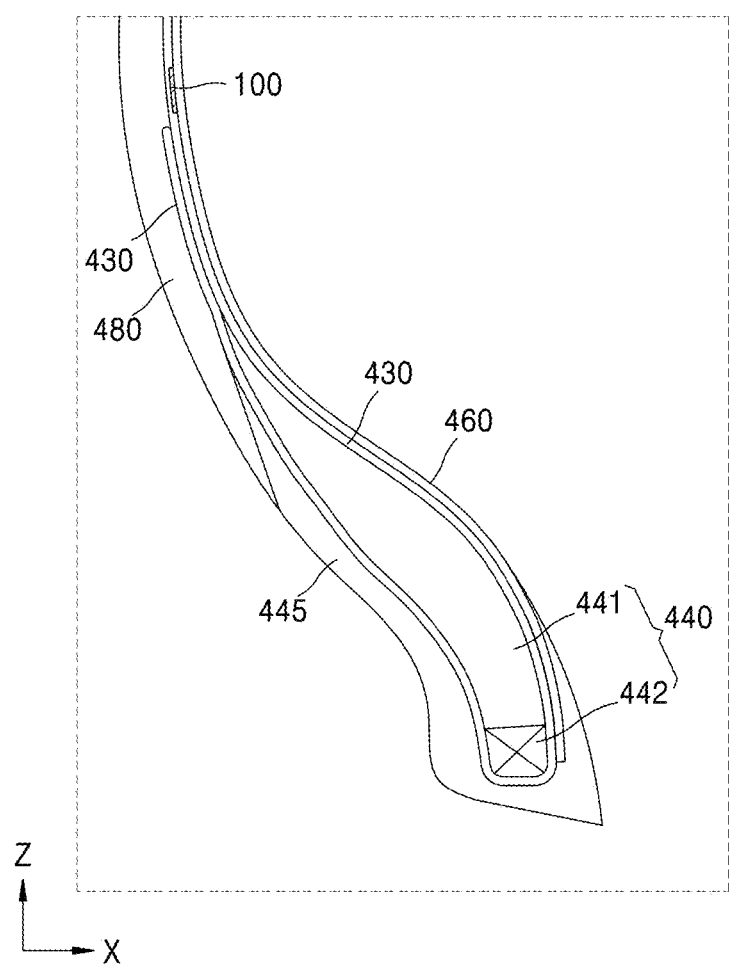
FIG. 9 is a partially enlarged view of the cross-sectional view of FIG. 8.

FIG. 8 is a schematic cross-sectional view in a thickness direction of a tire according to some embodiments. FIG. 9 is a partially enlarged view of the cross-sectional view of FIG. 8.

Referring to FIGS. 8 and 9, a tire 400 according to some embodiments may include a tread portion 410, a sidewall 480, and the electromagnetic tag module 100.

For the convenience of description, descriptions will be provided based on differences from the above-described embodiment.

The tread portion 410, grooves 415, the sidewall 480, a bead part 440, a body ply 430, a cap ply 420, a belt layer 470, and an inner liner 460 illustrated in FIGS. 8 and 9 are the same as those described in the foregoing embodiments, or some design changes may be made within a similar range, and thus a detailed description thereof will be omitted.

Referring to FIG. 9, the bead part 440 may include a bead filler portion 441 and a bead core portion 442. The bead core portion 442 may include a region in the form of a wire bundle, which has a square or hexagonal shape, in which a wire, for example, a steel wire is coated with rubber. The bead filler portion 441 may include a buffer region configured to distribute a load on the bead core portion 442 and mitigate an external impact, for example, may include a rubber material.

The electromagnetic tag module 100 may be disposed between the inner liner 460 and the body ply 430. For example, the electromagnetic tag module 100 may be disposed between the inner liner 460 and the body ply 430 at a position away from a double-overlapping region of the body ply 430 in a region not overlapping the bead part 440.

Figure 10:
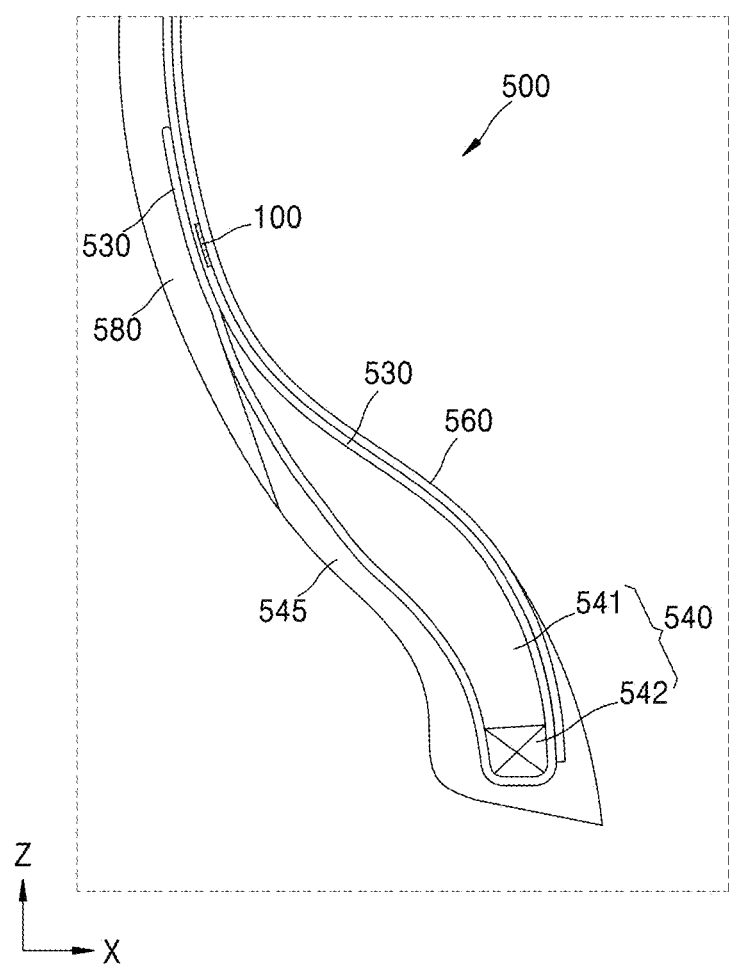
FIG. 10 is a schematic cross-sectional view of a peripheral region of a bead part of a tire according to some embodiments.

FIG. 10 is a schematic cross-sectional view of a peripheral region of a bead part of a tire according to some embodiments.

Referring to FIG. 10, a tire 500 according to some embodiments may include a sidewall 580 and the electromagnetic tag module 100.

For the convenience of description, descriptions will be provided based on differences from the above-described embodiment.

The sidewall 580, a bead part 540, a body ply 530, and an inner liner 560 are the same as those described in the foregoing embodiments, or some design changes may be made within a similar range, and thus a detailed description thereof will be omitted.

The electromagnetic tag module 100 may be disposed between the inner liner 560 and the body ply 530. For example, the electromagnetic tag module 100 may be disposed between one of the double overlapping body plies 530 and the inner liner 560 at a position corresponding to a double overlapping region of the body ply 530 in a region not overlapping the bead part 540.

Figure 11:
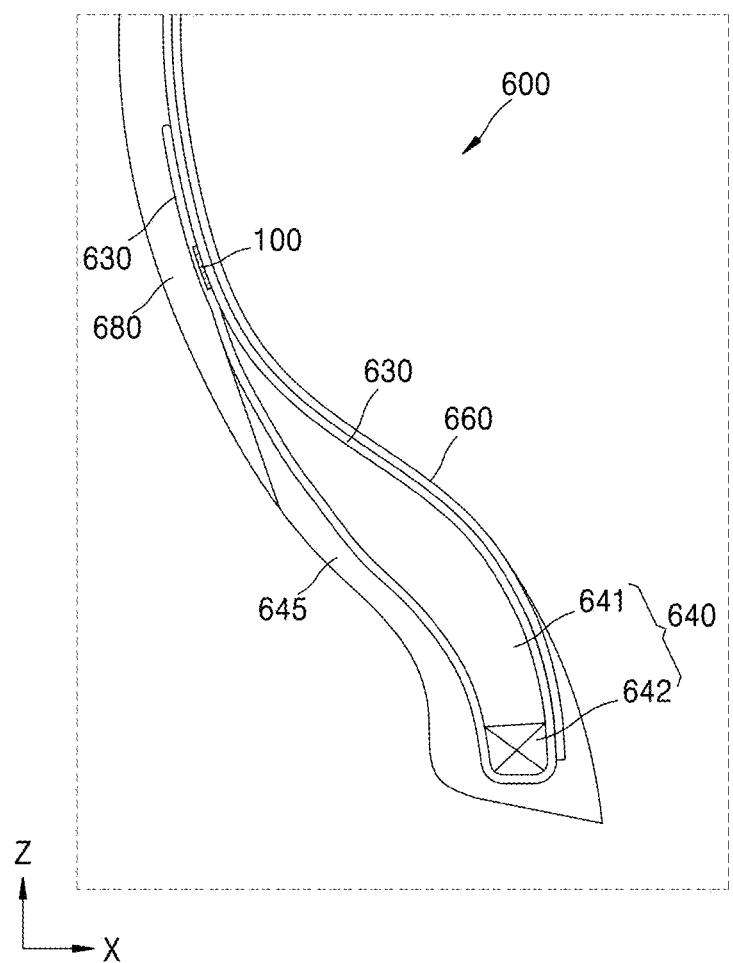
FIG. 11 is a schematic cross-sectional view of a peripheral region of a bead part of a tire according to some embodiments.

FIG. 11 is a schematic cross-sectional view of a peripheral region of a bead part of a tire according to some embodiments.

Referring to FIG. 11, a tire 600 according to some embodiments may include a sidewall 680 and the electromagnetic tag module 100.

For the convenience of description, descriptions will be provided based on differences from the above-described embodiment.

The sidewall 680, a bead part 640, a body ply 630, and an inner liner 660 are the same as those described in the foregoing embodiments, or some design changes may be made within a similar range, and thus a detailed description thereof will be omitted.

The electromagnetic tag module 100 may be disposed between the body ply 630 and the body ply 630. For example, the electromagnetic tag module 100 may be disposed between the body ply 630 and the body ply 630 at a position corresponding to a double-overlapping region of the body ply 630 in a region not overlapping the bead part 640.

Figure 12:
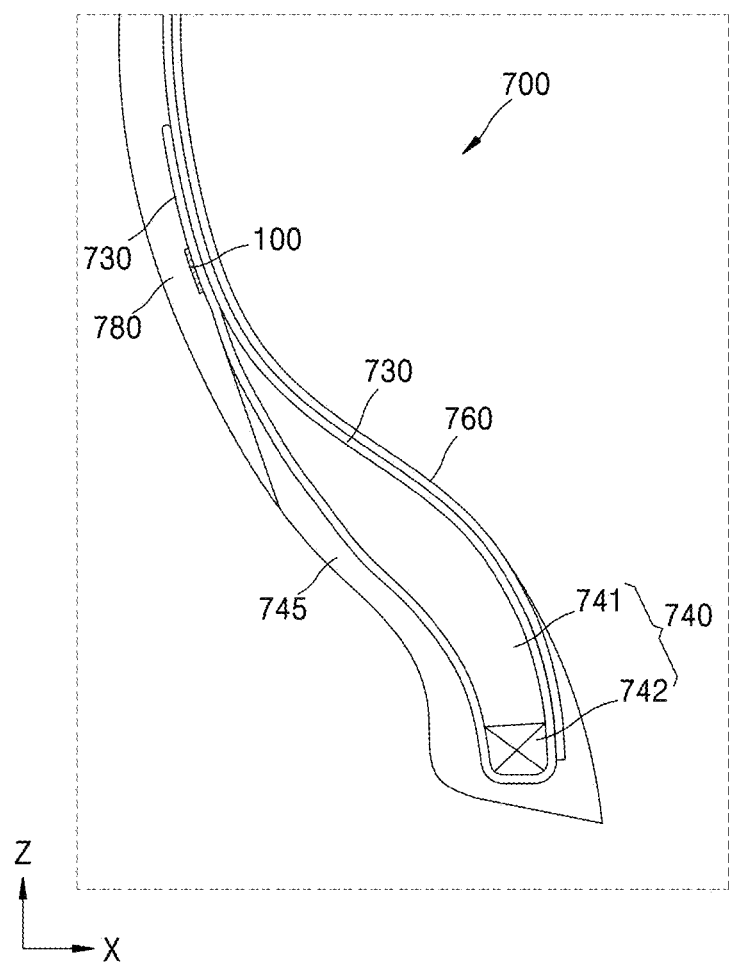
FIG. 12 is a schematic cross-sectional view of a peripheral region of a bead part of a tire according to some embodiments.

FIG. 12 is a schematic cross-sectional view of a peripheral region of a bead part of a tire according to some embodiments.

Referring to FIG. 12, a tire 700 according to some embodiments may include a sidewall 780 and the electromagnetic tag module 100.

For the convenience of description, descriptions will be provided based on differences from the above-described embodiment.

The sidewall 780, a bead part 740, a body ply 730, and an inner liner 760 are the same as those described in the foregoing embodiments, or some design changes may be made within a similar range, and thus a detailed description thereof will be omitted.

The electromagnetic tag module 100 may be disposed between the body ply 730 and the sidewall 780. For example, the electromagnetic tag module 100 may be disposed between the body ply 730 and the sidewall 780 at a position corresponding to a double-overlapping region of the body ply 730 in a region not overlapping the bead part 740.

Figure 13:
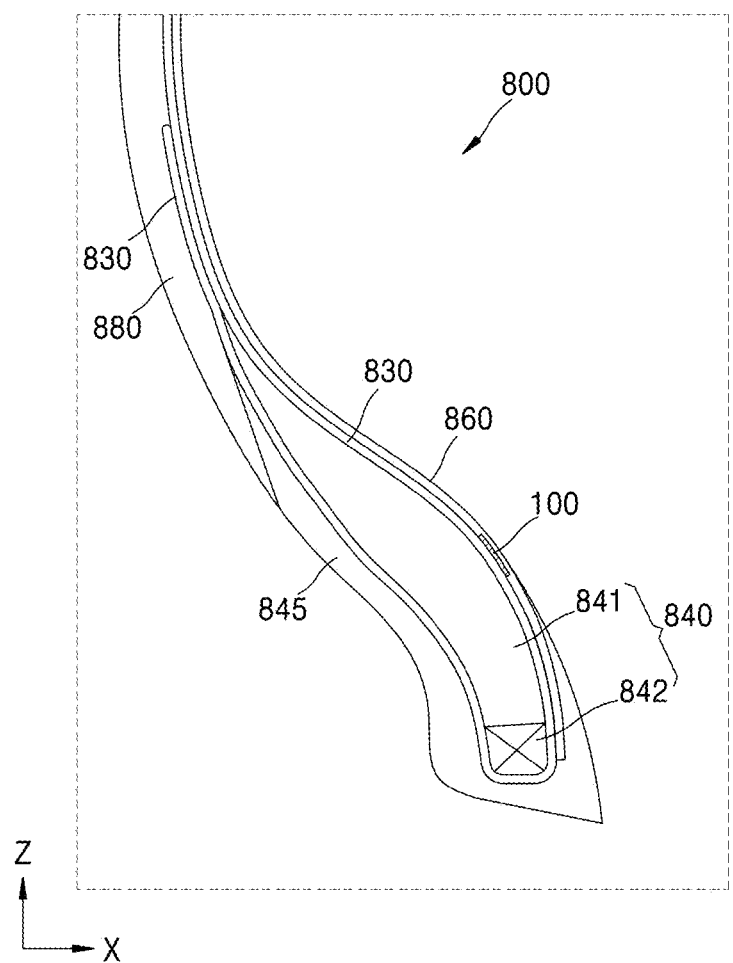
FIG. 13 is a schematic cross-sectional view of a peripheral region of a bead part of a tire according to some embodiments.

FIG. 13 is a schematic cross-sectional view of a peripheral region of a bead part of a tire according to some embodiments.

Referring to FIG. 13, a tire 800 according to some embodiments may include a sidewall 880 and the electromagnetic tag module 100.

For the convenience of description, descriptions will be provided based on differences from the above-described embodiment.

The sidewall 880, a bead part 840, a body ply 830, and an inner liner 860 are the same as those described in the foregoing embodiments, or some design changes may be made within a similar range, and thus a detailed description thereof will be omitted.

The electromagnetic tag module 100 may be disposed between the body ply 830 and the inner liner 860. For example, the electromagnetic tag module 100 may be disposed between the body ply 830 and the inner liner 860 in a region overlapping the bead part 840.

Figure 14:
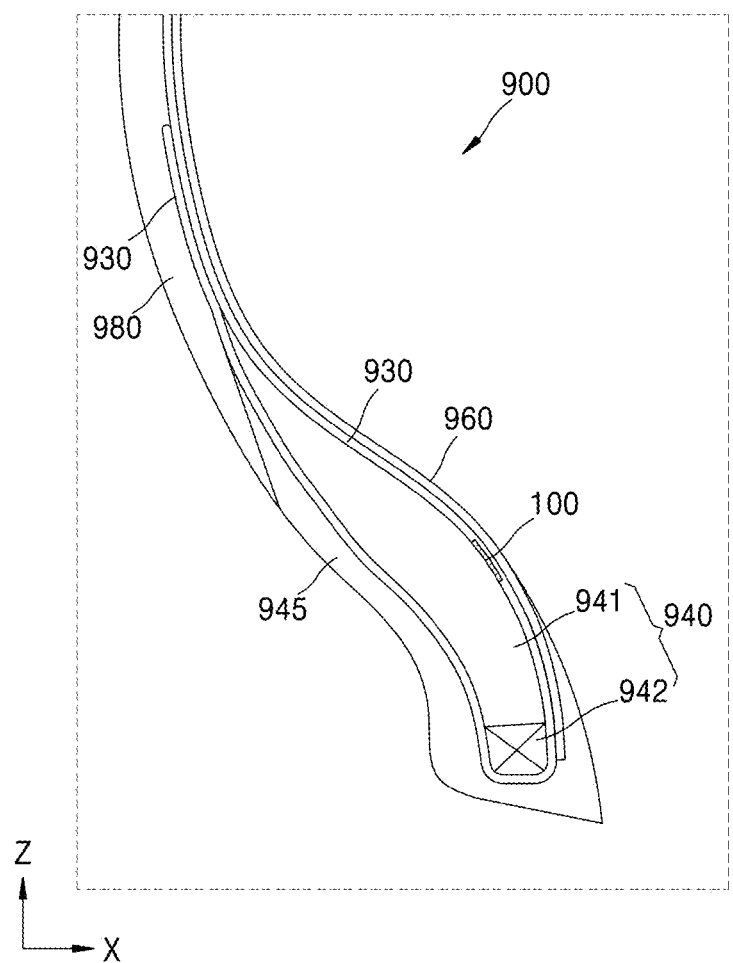
FIG. 14 is a schematic cross-sectional view of a peripheral region of a bead part of a tire according to some embodiments.

FIG. 14 is a schematic cross-sectional view of a peripheral region of a bead part of a tire according to some embodiments.

Referring to FIG. 14, a tire 900 according to some embodiments may include a sidewall 980 and the electromagnetic tag module 100.

For the convenience of description, descriptions will be provided based on differences from the above-described embodiment.

The sidewall 980, a bead part 940, a body ply 930, and an inner liner 960 are the same as those described in the foregoing embodiments, or some design changes may be made within a similar range, and thus a detailed description thereof will be omitted.

The electromagnetic tag module 100 may be disposed between the body ply 930 and the bead part 940. For example, the electromagnetic tag module 100 may be disposed between the body ply 930 and the bead part 940 so as to face the inner liner 960 in a region overlapping the bead part 940, and In an embodiment, the electromagnetic tag module 100 may be disposed between the body ply 930 and a bead filler portion 941 of the bead part 940.

Figure 15:
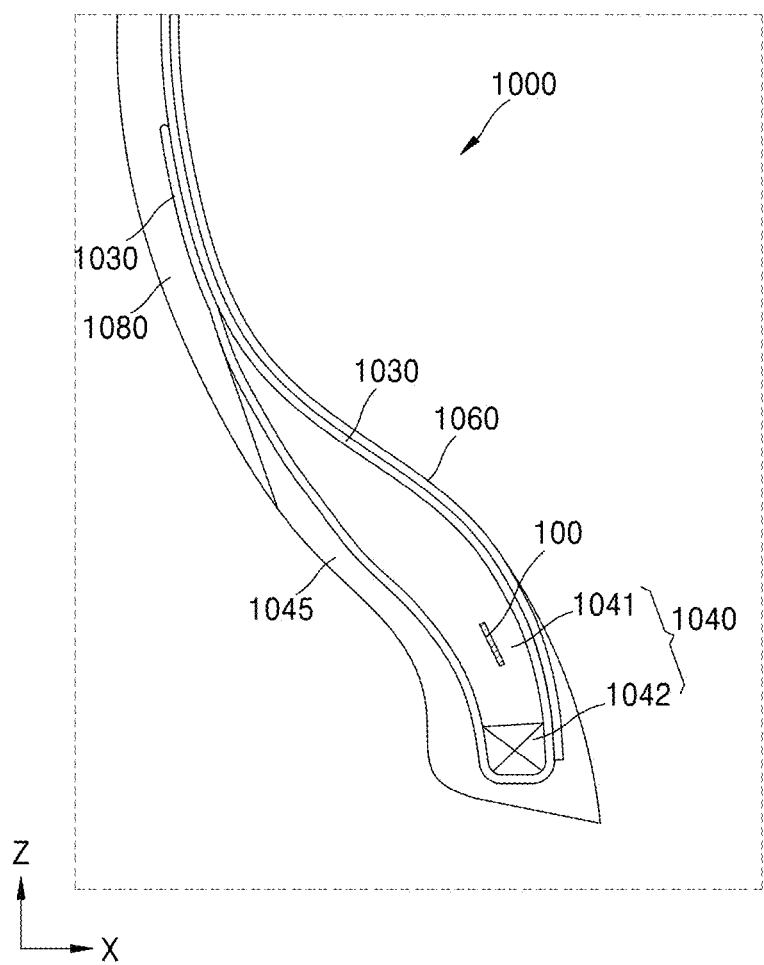
FIG. 15 is a schematic cross-sectional view of a peripheral region of a bead part of a tire according to some embodiments.

FIG. 15 is a schematic cross-sectional view of a peripheral region of a bead part of a tire according to some embodiments.

Referring to FIG. 15, a tire 1000 according to some embodiments may include a sidewall 1080 and the electromagnetic tag module 100.

For the convenience of description, descriptions will be provided based on differences from the above-described embodiment.

The sidewall 1080, a bead part 1040, a body ply 1030, and an inner liner 1060 are the same as those described in the foregoing embodiments, or some design changes may be made within a similar range, and thus a detailed description thereof will be omitted.

The electromagnetic tag module 100 may be disposed on an inner side of the bead part 1040. The electromagnetic tag module 100 may be disposed on an inner side of a bead filler portion 1041 of the bead part 1040.

In some embodiments, the electromagnetic tag module 100 may be formed in the bead filler portion 1041 in a region adjacent to the sidewall 1080, and may also be disposed in a region adjacent to the bead filler portion 1041.

For example, the bead part 1040 may include a turn-up portion defined as one end of the body ply 1030 is turned up and the one end is abutted or adjacent to a middle of the body ply 1030. Ends of the body ply 1030 may include turn-up surfaces facing each other when the turn-up portion is formed, and the electromagnetic tag module 100 may be disposed on the turn-up surface. In some embodiments, the electromagnetic tag module 100 may be disposed on the inner turn-up surface close to an inner side of a transportation means when the tire is mounted to the transportation means, and may also be disposed on the outer turn-up surface facing the inner turn-up surface.

Figure 16:
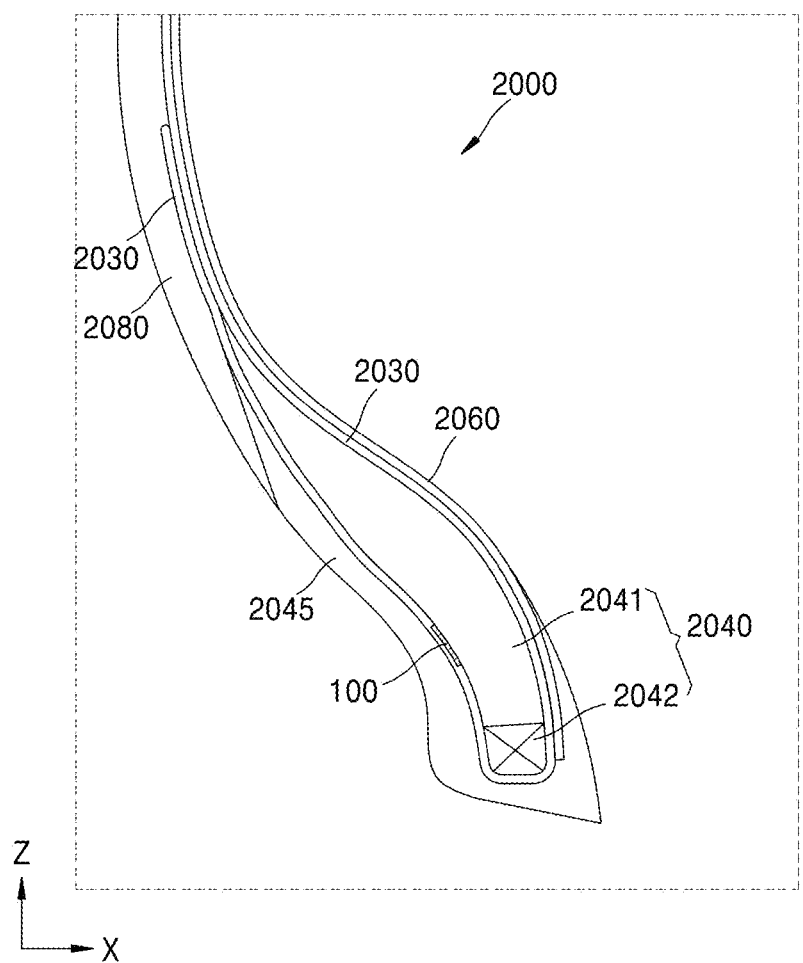
FIG. 16 is a schematic cross-sectional view of a peripheral region of a bead part of a tire according to some embodiments.

FIG. 16 is a schematic cross-sectional view of a peripheral region of a bead part of a tire according to some embodiments.

Referring to FIG. 16, a tire 2000 according to some embodiments may include a sidewall 2080 and the electromagnetic tag module 100.

For the convenience of description, descriptions will be provided based on differences from the above-described embodiment.

The sidewall 2080, a bead part 2040, a body ply 2030, and an inner liner 2060 are the same as those described in the foregoing embodiments, or some design changes may be made within a similar range, and thus a detailed description thereof will be omitted.

The electromagnetic tag module 100 may be disposed between the body ply 2030 and the bead part 2040. For example, the electromagnetic tag module 100 may face a surface of the bead part 2040, which is opposite to a surface of the bead part 2040 facing the inner liner 2060, among the surfaces of the bead part 2040, and may be disposed between the body ply 2030 and the bead part 2040, and In an embodiment, the electromagnetic tag module 100 may be disposed between the body ply 2030 and a bead filler portion 2041 of the bead part 2040.

Figure 17:
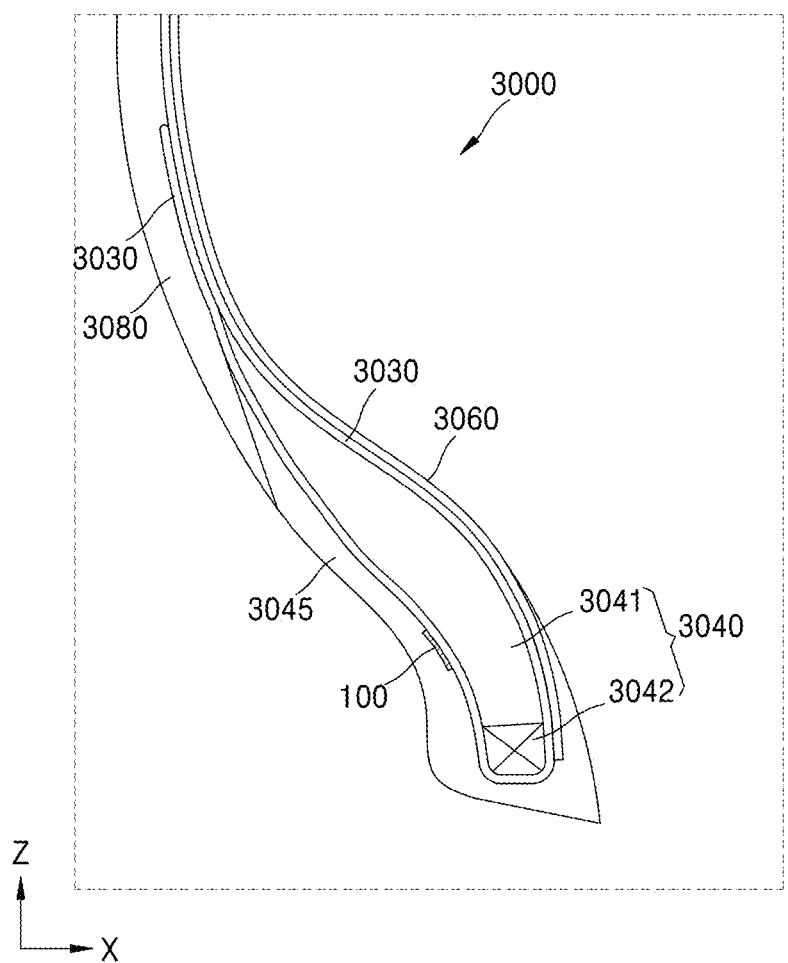
FIG. 17 is a schematic cross-sectional view of a peripheral region of a bead part of a tire according to some embodiments.

FIG. 17 is a schematic cross-sectional view of a peripheral region of a bead part of a tire according to some embodiments.

Referring to FIG. 17, a tire 3000 according to some embodiments may include a sidewall 3080 and the electromagnetic tag module 100.

For the convenience of description, descriptions will be provided based on differences from the above-described embodiment.

The sidewall 3080, a bead part 3040, a body ply 3030, and an inner liner 3060 are the same as those described in the foregoing embodiments, or some design changes may be made within a similar range, and thus a detailed description thereof will be omitted.

As an optional embodiment, a rim strip portion 3045 may be formed to be connected to the sidewall 3080. The rim strip portion 3045 may be formed to face a rim (or wheel) when the tire 3000 is coupled to the rim (or wheel), and may protect the bead part 3040 when the bead part 3040 corresponds to the rim and improve a coupling force with the rim.

The electromagnetic tag module 100 may be disposed between the body ply 3030 and the rim strip portion 3045. For example, the electromagnetic tag module 100 may be disposed between the body ply 3030 and the rim strip portion 3045 to overlap the bead part 3040.

Figure 18:
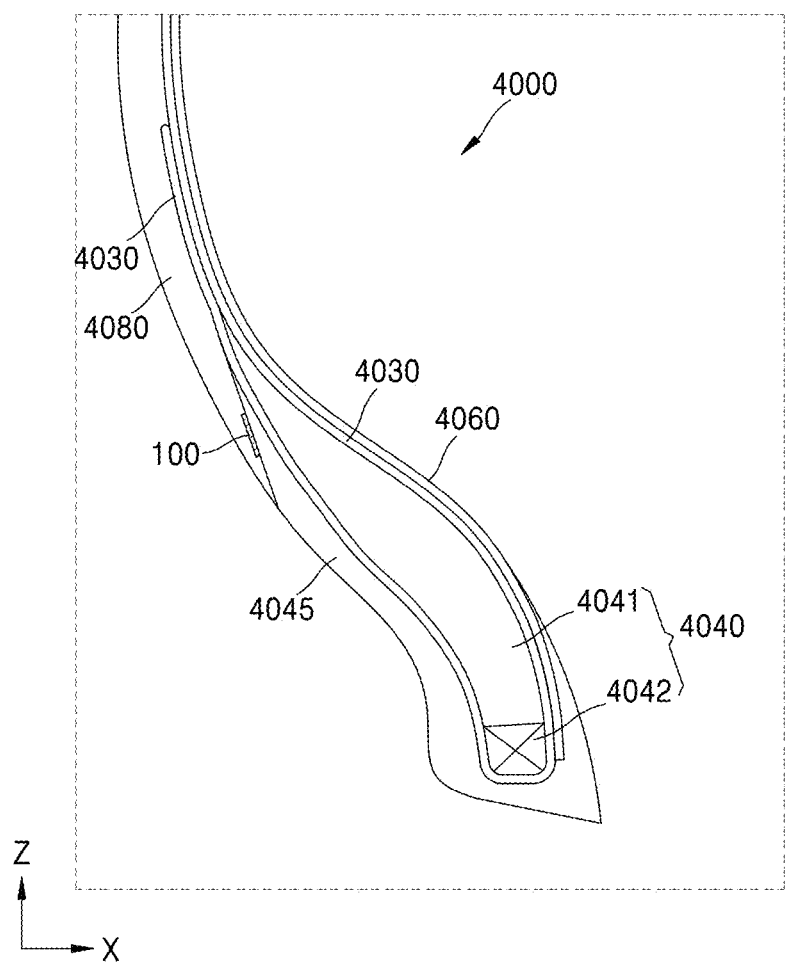
FIG. 18 is a schematic cross-sectional view of a peripheral region of a bead part of a tire according to some embodiments.

FIG. 18 is a schematic cross-sectional view of a peripheral region of a bead part of a tire according to some embodiments.

Referring to FIG. 18, a tire 4000 according to some embodiments may include a sidewall 4080 and the electromagnetic tag module 100.

For the convenience of description, descriptions will be provided based on differences from the above-described embodiment.

The sidewall 4080, a bead part 4040, a body ply 4030, and an inner liner 4060 are the same as those described in the foregoing embodiments, or some design changes may be made within a similar range, and thus a detailed description thereof will be omitted.

As an optional embodiment, a rim strip portion 4045 may be formed to be connected to the sidewall 4080. The rim strip portion 4045 may be formed to face a rim (or wheel) when the tire 4000 is coupled to the rim (or wheel), and may protect the bead part 4040 when the bead part 4040 corresponds to the rim and improve a coupling force with the rim.

The electromagnetic tag module 100 may be disposed between the sidewall 4080 and the rim strip portion 4045. For example, the electromagnetic tag module 100 may be disposed between the sidewall 4080 and the rim strip portion 4045 in a region overlapping the bead part 4040.

As described above, the electromagnetic tag module 100 may include one or more electrical elements, for example, a cover layer covering an integrated circuit (IC) chip. The cover layer may stably maintain a high resistance by including an insulating filler to control an electrical resistance thereof to be high, and accordingly, a reduction of a radio wave signal and an interference may be reduced, thereby increasing signal transmission efficiency and increasing a signal recognition distance. Accordingly, design freedom and convenience in which the electromagnetic tag module 100 can be disposed at various positions of a tire may be improved. In addition, a radio wave control cover layer includes a reinforcing material, and the reinforcing material improves a coupling force with a rubber-based material and improves a tensile strength of the cover layer, thereby improving the overall durability and anti-fatigue properties of the cover layer.

While the present disclosure has been described with reference to the embodiments shown in the drawings, which are merely exemplary, it will be understood by those of ordinary skill in the art that various modifications and equivalent other embodiments can be implemented from the given embodiments. Accordingly, the genuine technical range of the present disclosure to be protected should be determined by the technical idea of the accompanying claims.

The particular implementations shown and described herein are illustrative examples of the embodiments and are not intended to otherwise limit the scope of the embodiments in any way. In addition, no item or element is essential to the practice of the present disclosure unless the element is specifically described as "essential" or "critical".

The use of the terms "a" and "an" and "the" and similar referents in the context of describing the present disclosure (especially in the context of the following claims) are to be construed to cover both the singular and the plural. Further, recitation of ranges of values herein are merely intended to serve as a shorthand method of referring individually to each separate value falling within the range, unless otherwise indicated herein, and each separate value is incorporated into the specification as if it were individually recited herein. Finally, operations of all methods described herein can be performed in any suitable order unless otherwise indicated herein or otherwise clearly contradicted by context. The present disclosure is not limited to the described order of the operations. The use of any and all examples, or exemplary terms (e.g., "such as") provided herein, is intended merely to better illuminate the present disclosure and does not pose a limitation on the scope of the present disclosure unless otherwise claimed. In addition, numerous modifications and adaptations will be readily apparent to one of ordinary skill in the art without departing from the spirit and scope of the present disclosure.

The present disclosure will now be described in more detail with reference to the following examples. However, these examples are intended to illustrate one or more embodiments, but the scope of the present disclosure is not limited to these examples.

Preparation Examples 1 to 7: Preparation of Rubber Composition for Electromagnetic Tag Cover A rubber composition for an electromagnetic tag cover was prepared by compounding carbon black (N-339/N-660, OCI), acetylene black (Denka Black, Denka), silica (SiO$_2$, HD-165GRN, QUECHEN SILICONE CHEMICAL), and phenol formaldehyde resin (SL-2201, SINO LEGEND) in parts by weight shown in Table 1 below based on 100 parts by weight of natural rubber (SMR #20) or diene-based rubber (SBR 1500/KBR01, KKPC) as a base rubber.

TABLE 1

| Classification | Preparation Example 1 | Preparation Example 2 | Preparation Example 3 | Preparation Example 4 | Preparation Example 5 | Preparation Example 6 | Preparation Example 7 |
|---|---|---|---|---|---|---|---|
| Base rubber | 100 | 100 | 100 | 100 | 100 | 100 | 100 |
| Carbon black | 40 | 50 | 35 | 15 | 20 | 5 | 15 |
| Acetylene black | 30 | 0 | 0 | 0 | 0 | 0 | 0 |
| Silica | 0 | 0 | 15 | 35 | 80 | 110 | 35 |
| Phenol-formaldehyde-based resin | 0 | 0 | 0 | 0 | 0 | 0 | 2 |
| Total additives other than rubber | 70 | 50 | 50 | 50 | 100 | 115 | 50 |

Experimental Example 1: Evaluation of Electrical Properties of Rubber Composition for Electromagnetic Tag Cover A specimen of 15 cm wide×3 cm long×0.5 mm thick was prepared from the rubber composition for the electromagnetic tag cover of each of Preparation Examples, and specific resistance of each specimen was measured through an electrical conductivity measuring device, and the specific resistance of each specimen is shown in Table 2 below.

Experimental Example 2: Evaluation of Mechanical Properties of Rubber Composition for Electromagnetic Tag Cover A dumbbell-shaped specimen was prepared according to ASTM D412 from the rubber composition for the electromagnetic tag cover of each of Preparation Examples. For each specimen, Shore A hardness, modulus, tensile strength, and elongation at break were measured using a tensile tester (Instron-3366), and are shown in Table 2 below.

Experimental Example 3: Evaluation of Radio Wave Recognition Distance of Rubber Composition for Electromagnetic Tag Cover Two cover layers each having a thickness of 0.5 mm were prepared from the rubber composition for the electromagnetic tag cover of each of Preparation Examples, and thereafter, the cover layers were disposed on both sides of an RFID tag and the cover layers were pressed to be brought into close contact with each other to prepare an electromagnetic tag module.

The electromagnetic tag module was inserted into a bead part of a tire and vulcanized in a mold to prepare a sample tire, and a maximum recognition distance was measured through a portable RFID reader (ZEBRA RFD8500), and is shown in Table 2 below.

TABLE 2

| Classification | Preparation Example 1 | Preparation Example 2 | Preparation Example 3 | Preparation Example 4 | Preparation Example 5 | Preparation Example 6 | Preparation Example 7 |
|---|---|---|---|---|---|---|---|
| Specific resistance ($\Omega \cdot m$) | $1.2*10^3$ | $3.51*10^4$ | $4.0*10^7$ | $4.0*10^{10}$ | $4.0*10^{12}$ | $4*10^{13}$ | $4.0*10^7$ |
| Shore A Hardness (HS) | 71 | 61 | 56 | 60 | 66 | 70 | 60 |
| Modulus (kgf/cm2) | 80 | 75 | 55 | 64 | 73 | 68 | 78 |
| Tensile strength (kgf/cm$^2$) | 110 | 190 | 150 | 170 | 170 | 163 | 200 |
| Elongation at break (%) | 500 | 570 | 620 | 410 | 550 | 640 | 450 |
| Maximum recognition distance (cm) | 21.0 | 30.8 | 35.1 | 39.1 | 45.1 | 46.0 | 45.9 |

Referring to Table 2, in the case of the electromagnetic tag covered with the rubber composition for the electromagnetic tag cover of each of Preparation Examples, which has a specific resistance of $10^7$ Ω·m or more, it was confirmed that the maximum recognition distance for the radio wave was increased and the mechanical properties such as hardness, modulus, tensile strength, and elongation at break were improved.

Preparation Examples 8 to 12: Preparation of Electromagnetic Tag Module and Evaluation of Radio Wave Recognition Distance Electromagnetic tag modules were prepared in the same manner as in Experimental Example 3, except that cover layers on upper and lower surfaces of an RFID tag were formed of the rubber composition for the electromagnetic tag cover shown in Table 3 below.

The electromagnetic tag module was inserted into a bead filler of a tire so that the upper surface of the RFID tag faces the outside of the tire and the lower surface faces the inside of the tire, and then, vulcanized in a mold to prepare a sample tire, and a maximum recognition distance was measured through a portable RFID reader (ZEBRA RFD8500), and is shown in Table 3 below.

TABLE 3

| | Classification | | | | |
|---|---|---|---|---|---|
| | Preparation Example 8 | Preparation Example 9 | Preparation Example 10 | Preparation Example 11 | Preparation Example 12 |
| | Cover layer | | | | |
| | Upper side (outer side) | | | | |
| | Preparation Example 3 | Preparation Example 4 | Preparation Example 3 | Preparation Example 1 | Preparation Example 1 |
| | Lower side (inner side) | | | | |
| | Preparation Example 1 | Preparation Example 1 | Preparation Example 3 | Preparation Example 5 | Preparation Example 6 |
| Maximum recognition distance (cm) | 20.8 | 22.9 | 35.1 | 44.1 | 45.9 |
| Preparation Example 10 reference ratio (%) | 59.3 | 65.2 | 100.0 | 125.6 | 130.8 |

Referring to Table 3, in the case of the electromagnetic tag having an inner side surface, which is covered with the rubber composition whose specific resistance is $10^7$ Ω·m or more, and an outer side, which is covered with the rubber composition whose specific resistance is less than $10^7$ Ω·m, it was confirmed that the maximum recognition distance for an radio wave was improved as compared with the electromagnetic tag in which both surfaces were covered with the same rubber composition.

A tire according to embodiments uses an electromagnetic tag module including a reinforcing filler and an insulating filler and including a cover layer having a specific resistance of $10^7$ Ω·m or more, thereby effectively protecting an electromagnetic tag from physical and mechanical impacts and increasing a radio wave recognition distance.

In an electromagnetic tag module according to embodiments, a direction in which a radio wave is radiated is guided in an outward direction of a tire, so that a radio wave recognition distance and a recognition rate with respect to the outward direction of the tire can be improved.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A tire mounted on a transportation means, the tire comprising:
   a tire body including a tread region that faces a surface of a road during at least the driving of the transportation means; and
   an electromagnetic tag module disposed in the tire body and configured to transmit or receive one or more signals,
   wherein the electromagnetic tag module includes an electromagnetic tag, a cover layer that is disposed on an inner side surface of the electromagnetic tag and separate from the tire body, and a radio wave guide layer disposed on an outer side surface of the electromagnetic tag opposite to the inner side surface, wherein the outer side surface of the electromagnetic tag is closer to an outside of the tire than the inner side surface of the electromagnetic tag, wherein the inner side surface of the electromagnetic tag comprises an upper surface, a first side surface, and a second side surface, wherein the outer side surface of the electromagnetic tag comprises a lower surface, a third side surface extending from the first side surface, and a fourth side surface extending from the second side surface, wherein the cover layer directly contacts and covers all of the upper surface, the first side surface, and the second side surface of the electromagnetic tag, wherein the radio wave guide layer directly contacts and covers all of the lower surface, the third side surface, and the fourth side surface of the electromagnetic tag, wherein the electromagnetic tag is disposed between the cover layer and the radio wave guide layer to be in close contact with the cover layer and the radio wave guide layer, wherein each of the cover layer and the radio wave guide layer includes a base rubber, a reinforcing filler, and an insulating filler, wherein the cover layer contains a larger amount of insulating filler than the radio wave guide layer, and wherein the cover layer has a specific resistance of $4.0 \times 10^{12}$ Ω·m or more, and the radio wave guide layer includes a rubber composition having a specific resistance $1.2 \times 10^3$ Ω·m or less.

2. The tire of claim 1, wherein the electromagnetic tag module is disposed in a region adjacent to a tread portion of the tire body, a region adjacent to a sidewall, a region adjacent to a connection portion of the tread portion and the sidewall, or an inside of a bead part.

3. The tire of claim 1, wherein the reinforcing filler includes carbon black or boron nitride.

4. The tire of claim 1, wherein the insulating filler includes at least one of silica, titanium dioxide, talc, or calcium carbonate.

5. The tire of claim 1, wherein the cover layer includes at least 10 parts by weight of the insulating filler of the cover layer based on 100 parts by weight of the base rubber the cover layer.

6. The tire according to claim 1, wherein a total combined amount of the reinforcing filler and the insulating filler in the cover layer is 40 parts by weight or more based on 100 parts by weight of the base rubber in the cover layer.

7. The tire of claim 1, wherein the cover layer includes a rubber composition including a base rubber, a reinforcing filler, an insulating filler, and a reinforcing resin component.

8. The tire of claim 1, wherein the cover layer in the electromagnetic tag module has a modulus of 50 kgf/cm2 or more.

9. The tire of claim 1, wherein the cover layer in the electromagnetic tag module has a Shore A hardness of 50 HS or more.

10. The tire of claim 1, wherein the cover layer in the electromagnetic tag module has a tensile strength of 150 kgf/cm2 more.

11. The tire of claim 1, wherein the cover layer has a greater tensile strength than the radio wave guide layer.

12. The tire of claim 1, wherein the insulating filler comprises silica ($SiO_2$), and wherein the cover layer contains a larger amount of silica than the radio wave guide layer.

13. The tire of claim 1, wherein a total combined amount of the reinforcing filler and the insulating filler in each of the cover layer and the radio wave guide layer is 50 parts by weight or more based on 100 parts by weight of the base rubber in each of the cover layer and the radio wave guide layer.

14. The tire of claim 1, wherein the reinforcing filler of the radio wave guide layer is 40 parts by weight or more of the base rubber of the radio wave guide layer based on 100 parts by weight of the base rubber of the radio wave guide layer.

15. The tire of claim 1, wherein the reinforcing filler of the radio wave guide layer is 40 parts by weight or more of carbon black based on 100 parts by weight of the base rubber of the radio wave guide layer.

16. The tire of claim 1, wherein the reinforcing filler of the radio wave guide layer is 20 parts by weight or more of acetylene black based on 100 parts by weight of the base rubber of the radio wave guide layer.

* * * * *